United States Patent
Ekins

Patent Number: 5,966,993
Date of Patent: Oct. 19, 1999

[54] CLUTCH CABLE ADJUSTING MECHANISM

[76] Inventor: David L. Ekins, 7045 Darby Ave., Reseda, Calif. 91335

[21] Appl. No.: 09/177,740

[22] Filed: Oct. 23, 1998

[51] Int. Cl.[6] .............................. F16C 1/10; G05G 11/00
[52] U.S. Cl. ............................................. 74/502.2; 74/489
[58] Field of Search .................................. 74/489, 502.2, 74/523, 488, 531, 522, 525, 526; 188/471 XY, 2 D, 24.12

[56] References Cited

U.S. PATENT DOCUMENTS

| | | | |
|---|---|---|---|
| 3,808,908 | 5/1974 | Guerr | 74/489 |
| 4,088,040 | 5/1978 | Ross-Myring | 74/471 XY |
| 4,611,500 | 9/1986 | Nagano | 74/522 X |
| 4,667,785 | 5/1987 | Toyoda et al. | 74/532 X |
| 4,977,792 | 12/1990 | Nagano | 74/502.2 |
| 5,287,765 | 2/1994 | Scura | 74/502.2 |

FOREIGN PATENT DOCUMENTS

0585474 A1  3/1994  European Pat. Off. ................. 74/489

*Primary Examiner*—Vinh T. Luong
*Attorney, Agent, or Firm*—David O'Reilly

[57] ABSTRACT

A clutch cable lever operating system having a cable adjusting mechanism including a clamp for mounting the system on the handlebars of a motorcycle. The clutch cable lever fulcrum mounting flange to allow more or less free travel when the cable operating lever is used. The clutch cable adjusting mechanism is comprised of a coarse sleeve threaded into a cable adjusting cylinder that abuts the end of a cable outer sleeve. A manually adjusted threaded star nut or thumb wheel is fitted in a slot in the cable adjusting cylinder and threads on the coarse threaded sleeve. Rotation of the threaded star nut or thumb wheel incrementally extends or retracts the coarse threaded sleeve abutting the end of cable to adjust the slack that occurs when clutch plates expand due to heat. A resilient washer in an annulus intersecting the threads in the star nut or thumb wheel prevents free movement of the star nut on the coarse threaded sleeve to maintain the adjusted position. The resilient washer prevents free movement of the star nut from an adjusted position which might be caused by vibration during operation of a motorcycle.

4 Claims, 2 Drawing Sheets

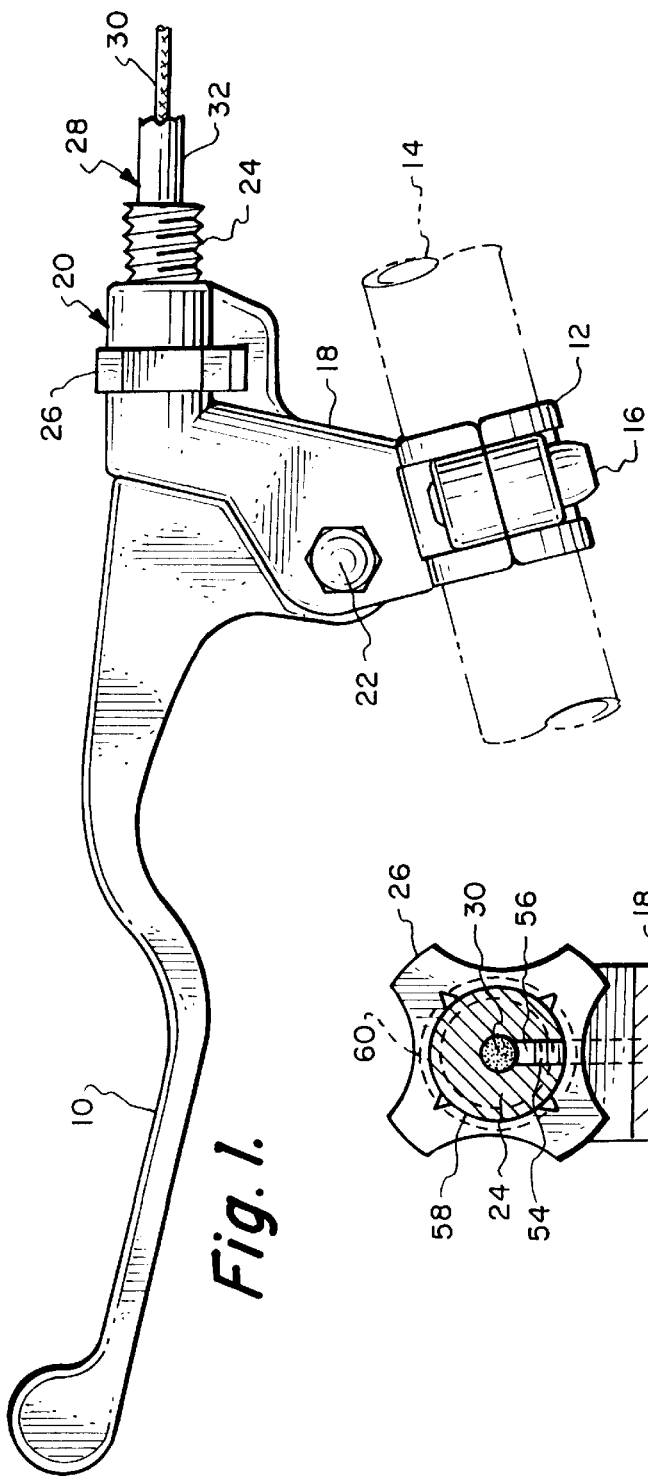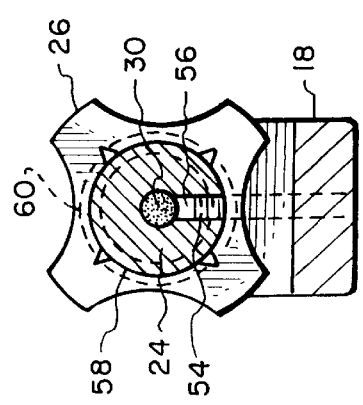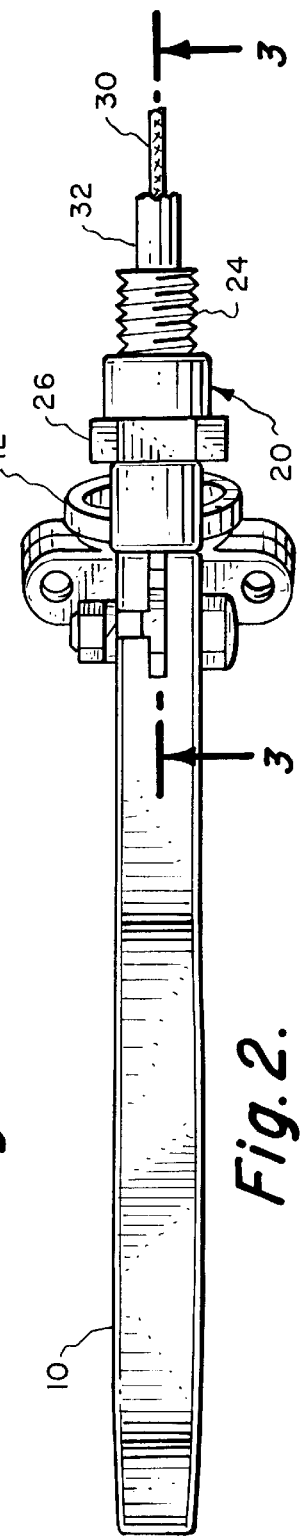

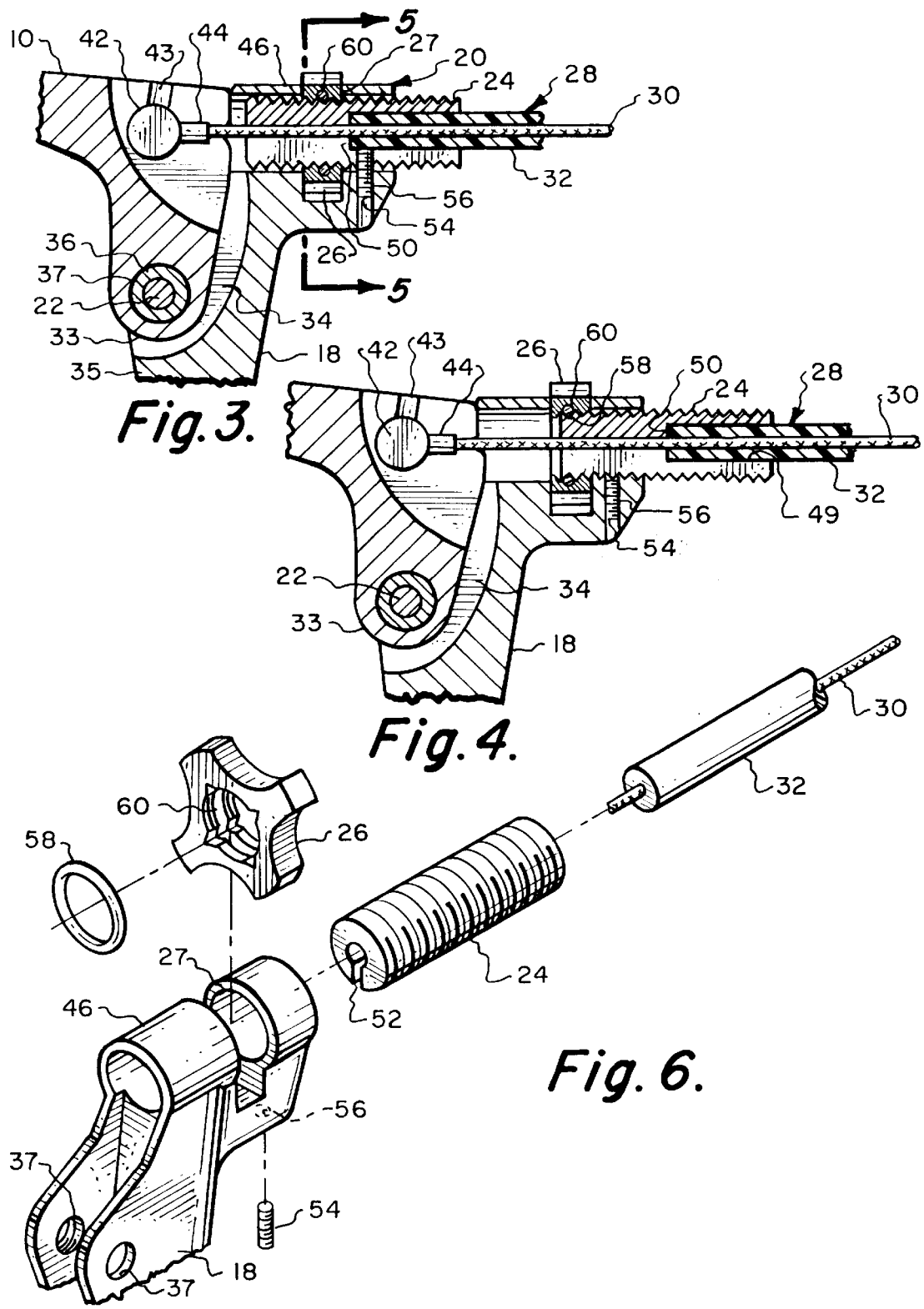

CLUTCH CABLE ADJUSTING MECHANISM

BACKGROUND OF THE INVENTION

1. Field of the Invention

This invention relates to clutch lever systems for motorcycles and similar vehicles, and more particularly, relates to a clutch cable adjustment mechanism for motorcycles.

2. Background Information

Lever operated cable systems are used on motorcycles and similar vehicles for operation of clutches. The cable systems used to operate clutches often need adjustment due to temperature related component expansions. The clutch is operated by pulling a lever to pull a cable and operate the clutch. Slack in the cable can make operation of the clutch difficult, or prevent operation altogether. In many cases, adjustments can be performed when the vehicle is not in use. However, in certain situations these adjustments can become critical and there is a need to make adjustments while the vehicle is in motion.

When motorcycles are used for racing, adjustment of the clutch mechanism can be critical. Motorcycle clutch plates expand under use due to the heat generated. This can cause the clutch lever mechanism to slacken and ultimately become almost useless. This, of course, can be a serious situation if it occurs during a race. The motorcycle operator cannot stop to make an adjustment, and difficulty in operating the clutch can sufficiently slow the motorcycle to result in a loss of time and probably, the loss of a race. Therefore, it would be advantageous if adjustments could be made while the motorcycle is in motion.

Presently, adjustment mechanisms for these motorcycles are comprised of a threaded shaft attached to the end of the cable which is tightened by tightening a nut on the threaded shaft. The nut is then clamped in place with a second nut to maintain the tension on the cable. However, when a cable becomes lose due to excessive heat causing the clutch plates to expand, there is no way to make these adjustments while the vehicle is in motion.

It is therefore one object of the present invention to provide a clutch cable mechanism adjustment that can be performed while the vehicle is in motion.

Another object of the present invention is to provide a clutch cable adjustment mechanism having a manually operated star nut to adjust the tension on the clutch cable while a vehicle is in motion.

Still another object of the present invention is to provide a clutch cable adjustment mechanism having universally applicable to all motorcycles.

Yet another object of the present invention is to provide a clutch cable adjusting mechanism having its free length adjusted by a threaded star nut set by an interval resilient washer to prevent it from freely rotating.

Still another object of the present invention is to have a clutch cable adjustment mechanism of a star nut with a resilient washer to maintain an adjusted position and prevent movement from vibration.

Yet another object of the present invention is to provide a clutch cable adjusting mechanism having a lever bracket housing large enough in diameter to accept complete motorcycle clutch cable assemblies.

BRIEF DESCRIPTION OF THE INVENTION

The purpose of the present invention is to provide a clutch cable adjusting mechanism that can be easily adjusted while a motorcycle is in motion.

The clutch cable adjusting mechanism of the present invention is comprised of a clamp for clamping the clutch cable assembly to the handlebar of a motorcycle having a clutch operating lever mounted on the clamp. The clutch operating lever is mounted on the clamp by a flange which provides a fulcrum. The fulcrum on the end of the flange, is attached to the handlebar clamp by a threaded bolt inserted through a bushing in the lever. The fulcrum mounting hole in the flange provides the maximum travel of the clutch cable operating lever and applies the most travel on the clutch cable.

A clutch cable adjusting mechanism is provided by a lever bracket housing and a cable adjusting cylinder mounted on the handlebar clamp that is large enough in diameter to accept the complete motorcycle clutch cable assembly. The cable adjusting mechanism features a course threaded sleeve inserted in the cable adjusting cylinder. The coarse threaded sleeve is long enough to accommodate substantially all motorcycle clutch cables to make the device universally applicable.

The clutch cable is a coaxial cable having an inner steel cable and an outer cable sleeve. The inner clutch cable passes through the threaded sleeve and cable adjusting cylinder. A cable barrel, clamped on the end of the cable, seats in a notch in the operating lever to securely hold and operate the cable.

The outer cable sleeve has a sleeve cap seated in a socket in the interior of the coarse threaded sleeve against a shoulder. The coarse threaded sleeve has a longitudinal slot for receiving a guide screw to prevent the sleeve from turning when adjustments are being made to the cable.

Cable adjustments are performed by a star nut or thumb wheel threaded on the coarse threaded sleeve. Rotation of the threaded star nut extends or retracts the coarse threaded sleeve to adjust the tension on the outer cable of the clutch to adjust for excessive slack. The threaded star nut has an interior resilient washer in the threads which prevents the threaded star nut from freely rotating after an adjustment is made. Use of such resilient washers of members inside nuts has long been known. Such devices are used as lock nuts to prevent them from loosening after installation. Such devices are disclosed in U.S. Pat. No. 180,064 issued Jul. 18, 1876, U.S. Pat. No. 184,835 issued Nov. 28, 1876, U.S. Pat. No. 4,749,320 issued Jun. 7, 1988 and U.S. Pat. No. 5,584,210 issued Dec. 17, 1996 all teach the use of a resilient member in the threads of a nut to lock the nut in place after installation. Use of such a device in a manually adjustable star nut or thumb wheel for making and setting adjustments "on the fly" is a unique application of the principle. It solves the problem of clutch adjustments during a race that normally cannot be made at all.

To take up slack in the cable, the threaded star nut is manually rotated by the rider to adjust the cable and take up slack. Each adjustment is set by resilient washer that prevents movement from the set position that might be caused by vibrations when the motorcycle is running. This can be done while the motorcycle is in motion to compensate for expansion of motorcycle clutch plates under strenuous use such as the heat generated during a race.

The above and other novel features of the invention will be more fully understood from the following detailed description and the accompanying drawings, in which:

BRIEF DESCRIPTION OF THE DRAWINGS

FIG. 1 is a side elevation of the clutch lever and cable adjusting mechanism according to the invention.

FIG. 2 is a top view of the clutch operating lever and cable adjusting mechanism.

FIG. 3 is a sectional view taken at 3—3 of FIG. 2.

FIG. 4 is a sectional view, similar to FIG. 3, illustrating operation of the invention.

FIG. 5 is a sectional view taken at 5—5 of FIG. 3.

FIG. 6 is an exploded view of the clutch cable adjusting mechanism according to the invention.

DETAILED DESCRIPTION OF THE INVENTION

A clutch lever operating system with a cable adjusting mechanism is illustrated in FIG. 1. A clutch lever operating mechanism is comprised of clutch operating lever 10 and handlebar clamp 12 for clamping the clutch lever operating system on handlebar 14 with bolt 16. The cable lever operating system also includes cable lever 18 and cable adjusting mechanism 20 comprised of threaded sleeve 24 and star nut or thumb wheel 26 which will be described in greater detail hereinafter. Cable operating lever 10 is mounted on clamp 12 by threaded screw 22 as will be described in greater detail hereinafter.

Clutch cable adjusting mechanism 20 includes coarse threaded sleeve 24 and a thumb operated star nut 26 receiving coaxial clutch cable 28 comprised of inner cable 30 and other cable sleeve 32. Inner cable 30 is secured to cable operating lever 10 while outer cable sleeve 32 is secured to coarse threaded sleeve 24 for adjusting the slack in the cable by cable adjusting threaded star nut 26 as will be described in greater detail hereinafter.

The mounting system for cable operating lever 10 and clutch cable adjusting mechanism 20 is shown in greater detail in FIGS. 3 and 4. Clutch operating lever 10 has lever flange 33 providing a mounting system. Flange 33 fits into slot 34 in a fulcrum housing 35 formed on handlebar clamp 12. Fulcrum housing 35 has threaded holes on either side for receiving threaded pin or screw 22 passing through bushing 36 mounted in hole 37 on lever flange 33.

Clutch cable 28 is secured to cable operating lever 10 by cable barrel 42 mounted on inner cable 30. Cable barrel 42 is securely crimped at 44 onto the end of steel cable 32. Cable barrel 42 is then seated in notch 43 provided in cable lever 10. Operation of lever 10 applies tension to clutch cable 28.

A unique cable adjusting mechanism is also illustrated in FIGS. 3 through 5. Cable adjusting mechanism 20 is comprised of cable adjusting cylinder 46 formed on cable lever mounting bracket 18 for receiving the cable adjusting components. Cable adjusting cylinder 46 is large enough in diameter to accept the complete motorcycle clutch adjusting cable assembly. Cable adjusting cylinder 46 receives-coarse threaded sleeve 24 and star nut 26 inserted in slot 27 threaded over coarse threaded sleeve 24. Outer cable sleeve 32 fits into coarse threaded sleeve 24 and is seated against shoulder 50 near the inner end of socket 49 in coarse threaded sleeve 24. Slack in cable 28 is taken up by moving coarse threaded sleeve 24 out of, or into cable adjusting cylinder 46 as will be described in greater detail hereinafter.

Coarse threaded sleeve 24 has a lengthwise slot 52 which can be seen more clearly in FIG. 6. A guide screw 54 is threaded through hole 56 in cable adjusting cylinder 46 to engage lengthwise slot 52 to prevent coarse threaded sleeve 24 from turning when adjustments to cable 28 are being made. Preferably, coarse threaded sleeve 24 is made long enough to accommodate the free length of most motorcycle clutch cables. This allows the cable adjusting mechanism to be universally adaptable to almost all existing motorcycles.

Adjustments are made to take up slack in cable 38 with threaded star nut 26 which is threaded on coarse threaded sleeve 24. Manual rotation of star nut 26 extends or retracts coarse threaded sleeve 24 in or out of clutch cable adjusting cylinder 46. Extending the coarse threaded sleeve 24 increases cable tension to take up slack while retracting it loosens the cable.

Threaded star nut or thumb wheel 26 includes resilient washer 58 in annulus 60 in the threads of the star nut. The free length of cable 28 is adjusted by manual rotation of star nut or thumb wheel to incrementally advance or retract sleeve 24 with cable 28 attached.

The unique clutch cable adjusting mechanism allows adjusting the free travel of cable 28 while a motorcycle is in motion. This alleviates difficulties in operating a clutch when the clutch plates expand from the heat under excessive use in off-road racing. Star nut or thumb wheel 26 can be rotated manually to make precise incremental adjustments. With resilient washer 58 inside star wheel 26 free movement after incremental adjustments are set is prevented.

The clutch cable adjusting mechanism also eliminates the need to stop and make adjustments as in present systems. With present systems a locking nut has to be released and then the adjustments made. This operation cannot be performed while a motorcycle is in motion. The manual incremental adjustment and star nut for adjusting the travel of coarse threaded sleeve 24 will adjust the free travel of cable 28 taking up any slack in the cable as it occurs during a race. The resilient washer 58 in the threads of star nut 26 prevents free movement after adjustment from vibration of the motorcycle during opportune. Each incremental adjustment is set and maintained by preventing free movement of star nut and coarse threaded sleeve 24.

Thus, there has been described a unique clutch cable lever operating system and a cable adjusting mechanism that allows adjustments to be made while a motorcycle is in motion. The clutch cable lever operating system has fulcrum mounting system for secure mounting on the handlebar of a motorcycle. The cable adjusting mechanism, having a coarse threaded sleeve and a star nut or thumb wheel threaded nut with an interval resilient washer inside the threads, allow adjustments to be made while the motorcycle or like vehicle is in motion. Manual rotation of the threaded star nut or thumb wheel, while in motion, adjusts the free travel or slack in a cable and the incremental adjusted position is maintained by the resilient washer inside the threads. The cable lever operating system and clutch cable adjusting mechanism are designed with unique features that make the entire system universally adaptable to most motorcycles or like vehicles.

This invention is not to be limited by the embodiment shown in the drawings and described in the description which is given by way of example and not of limitation, but only in accordance with the scope of the appended claims.

What is claimed is:

1. A clutch cable adjusting mechanism comprising;
    a clutch cable operating lever;
    threaded cable adjusting cylinder;
    a coarse threaded sleeve threaded into said cylinder receiving one end of said clutch cable;
    claim means for clamping said cable adjusting mechanism on a handlebar, said cable adjusting cylinder being integrally formed in said clamp means;

said coarse threaded sleeve comprising a threaded hollow sleeve having an interior shoulder at one end of abutting an end of a clutch cable, rotation preventing means for preventing said coarse threaded sleeve from rotating when adjustments are being made, said coarse threaded sleeve has a length selected to accommodate a wide of clutch cables;

said rotation prevention means comprising a lengthwise slot in said threaded hollow sleeve, and a guide screw engaging said lengthwise slot to prevent said threaded sleeve from rotating while allowing axial movement;

manual adjusting means for manual incremental adjusting said clutch cable by extending or retracting said coarse threaded sleeve from said threaded cable adjusting cylinder while in motion.

2. The cable adjusting mechanism according to claim 1 including free movement prevention means for setting said manual adjusting means at each incrementally adjusted position.

3. The cable adjusting mechanism according to claim 2 in which said free movement preventing means comprises resilient means inside said manual adjusting means for incrementally adjusting and holding said manual adjusting means in each adjusted position.

4. The cable adjusting mechanism according to claim 3 in which said manual adjusting means comprises a star nut threaded on said coarse threaded sleeve; and annulus in the threads of said star nut and a resilient washer in said annulus.

* * * * *